(12) United States Patent
Zou et al.

(10) Patent No.: US 10,907,841 B2
(45) Date of Patent: Feb. 2, 2021

(54) AIR CONDITIONER INSTALLATION PLATE AND AIR CONDITIONER

(71) Applicants: GD MIDEA AIR-CONDITIONING EQUIPMENT CO., LTD., Guangdong (CN); MIDEA GROUP CO., LTD., Guangdong (CN)

(72) Inventors: Kuifang Zou, Guangdong (CN); Zhicai Cai, Guangdong (CN); Wenjun Luo, Guangdong (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/583,416

(22) Filed: Sep. 26, 2019

(65) Prior Publication Data
US 2020/0363077 A1 Nov. 19, 2020

Related U.S. Application Data

(63) Continuation of application No. PCT/CN2019/103797, filed on Aug. 30, 2019.

(30) Foreign Application Priority Data

May 17, 2019 (CN) .................... 2019 2 0716730 U
May 17, 2019 (CN) .................... 2019 2 0721257 U
May 17, 2019 (CN) .................... 2019 2 0721294 U

(51) Int. Cl.
*F24F 1/0057* (2019.01)
*G01F 23/00* (2006.01)
(Continued)

(52) U.S. Cl.
CPC .............. *F24F 1/0057* (2019.02); *F24F 1/02* (2013.01); *F24F 13/20* (2013.01); *G01F 23/0007* (2013.01)

(58) Field of Classification Search
CPC . F24F 1/0057; F24F 13/20; F24F 1/02; G01F 23/0007; G01C 9/28
See application file for complete search history.

(56) References Cited

U.S. PATENT DOCUMENTS 4,208,802 A * 6/1980 Berndt ................... A47G 1/168
33/347
4,580,350 A * 4/1986 Fincher .................... G01C 9/28
33/334
(Continued)

FOREIGN PATENT DOCUMENTS

CN 201053741 Y * 8/2002
CN 1942737 A 4/2007
(Continued)

OTHER PUBLICATIONS

International Search Report and Written Opinion dated Feb. 1, 2020 received in International Application No. PCT/CN2019/103797 together with an English language translation.
(Continued)

*Primary Examiner* — Emmanuel E Duke
(74) *Attorney, Agent, or Firm* — Scully Scott Murphy & Presser

(57) ABSTRACT

The present disclosure provides an air conditioner installation plate and an air conditioner. The air conditioner installation plate includes: a main plate, a clamping member on a surface of the main plate, the clamping member and the main plate collectively a clamping space; and a horizontal bubble, provided in the clamping space and filled with liquid, an air bubble being reserved in the liquid of the horizontal bubble; a transverse direction of the horizontal
(Continued)

bubble is parallel to a transverse direction of the main plate, two position indicating lines being marked on a middle of the horizontal bubble at intervals along the transverse direction.

12 Claims, 17 Drawing Sheets

(51) Int. Cl.
*F24F 13/20* (2006.01)
*F24F 1/02* (2019.01)

(56) References Cited

U.S. PATENT DOCUMENTS

| | | | | |
|---|---|---|---|---|
| 5,636,816 A | * | 6/1997 | Burton | F24F 13/32 248/208 |
| 6,434,848 B1 | * | 8/2002 | Gordon | E04F 21/04 33/379 |

FOREIGN PATENT DOCUMENTS

| | | | |
|---|---|---|---|
| CN | 201053741 Y | * | 4/2008 |
| CN | 204718086 U | | 10/2015 |
| CN | 204718086 U | * | 10/2015 |
| CN | 106052083 A | * | 10/2016 |
| CN | 106052083 A | | 10/2016 |
| CN | 205664549 U | * | 10/2016 |
| CN | 206831806 U | | 1/2018 |
| DE | 20 2006 0001 16 U1 | | 3/2006 |
| EP | 1 914 484 A2 | | 4/2008 |
| JP | 2001-272227 A | | 10/2001 |
| JP | 2005-016856 A | | 1/2005 |
| KR | 1999-0013692 U | | 4/1999 |
| KR | 1999-0016604 U | | 5/1999 |
| TW | 201816339 A | * | 5/2018 |

OTHER PUBLICATIONS

Supplementary European Search report dated Nov. 3, 2020 received in European Patent Application No. EP 19769983.8.
Reasons for Rejection dated Nov. 24, 2020 received in Korean Patent Application No. KR 10-2019-7031723 together with an English language translation.

* cited by examiner

AIR CONDITIONER INSTALLATION PLATE AND AIR CONDITIONER

CROSS-REFERENCE TO RELATED APPLICATIONS

The present disclosure is a Continuation Application of PCT Application with No. PCT/CN2019/103797, filed on Aug. 30, 2019, which claims the priority of Chinese Patent Application with No. 201920716730.X, entitled "AIR CONDITIONER INSTALLATION PLATE AND AIR CONDITIONER", filed on May 17, 2019, and Chinese Patent Application with No. 201920721257.4, entitled "AIR CONDITIONER INSTALLATION PLATE AND AIR CONDITIONER", filed on May 17, 2019, and Chinese Patent Application with No. 201920721294.5, entitled "AIR CONDITIONER INSTALLATION PLATE AND AIR CONDITIONER", filed on May 17, 2019, the entirety of which are hereby incorporated herein by reference.

FIELD

The present disclosure relates to the field of air conditioning technology, and in particular, to an air conditioner installation plate and an air conditioner using the same.

BACKGROUND

The existing installation procedure of an indoor unit of an air conditioner is complicated. An air conditioner installation plate is typically fixed on an installation base (for example, a wall surface), before an indoor unit of an air conditioner is installed on the air conditioner installation plate. Thus, horizontal installation accuracy has to be ensured of the air conditioner installation plate on the installation base and an additional level gauge is generally needed to assist such installation. Further, an installer has to hold the air conditioner installation plate with one hand while adjust the leveling gauge with the other hand. The leveling of the air conditioner installation plate has to been done by multiple adjustments, and another installer is required to mark after the unit is positioned, which increases the labor intensity, and the overall installation efficiency is low.

The above content is only used to assist in understanding the technical solutions of the present disclosure, and does not constitute an admission that the above is prior art.

SUMMARY

The main purpose of the present disclosure is to provide an air conditioner installation plate, aiming at quickly and easily adjusting the levelness of the air conditioner installation plate, and further improving installation efficiency and measurement accuracy.

To achieve the above purpose, the present disclosure provides an air conditioner installation plate, which includes:

a main plate, which is provided with a clamping member on a surface of the main plate, and the clamping member and the main plate collectively defining a clamping space; and a horizontal bubble, which is fixed in the clamping space and filled with liquid, and an air bubble is reserved in the liquid of the horizontal bubble; a transverse direction of the horizontal bubble is parallel to a transverse direction of the main plate; two position indicating lines are marked on a middle of the horizontal bubble at intervals along the transverse direction.

In an embodiment of the present disclosure, a distance $L1$ of one side of the bubble from an adjacent one of the position indicating lines is at least 1 mm and at most 5 mm.

In an embodiment of the present disclosure, the clamping member is detachably connected to the main plate;

or, the clamping member and the main plate are integrally formed.

In an embodiment of the present disclosure, the clamping member includes a connecting section and a clamping section. The connecting section is connected to the surface of the main plate, and the clamping section is bent and connected to a lateral side of the connecting section away from the main plate. The connecting section, the clamping section, and the main plate collectively define the clamping space.

In an embodiment of the present disclosure, a guiding section is arranged on a lateral side of the clamping section away from the connecting section, and a distance between the guiding section and the main plate increases gradually in a direction away from the clamping section;

and/or, the clamping section has an arc shape, and the arc shape is curved along a direction away from the main plate.

In an embodiment of the present disclosure, the main plate is further provided with two limiting blocks, which are connected to the main plate and respectively abutted against an end of the horizontal bubble along the transverse direction.

In an embodiment of the present disclosure, two clamping member are provided at intervals along the transverse direction of the horizontal bubble.

In an embodiment of the present disclosure, an auxiliary fastening member is further provided between the two clamping members, and the auxiliary fastening member is connected to the main plate to define an auxiliary space.

In an embodiment of the present disclosure, the main plate is provided with a through opening corresponding to each of the clamping members, and a limiting plate configured to abut against the horizontal bubble is provided between the two through openings.

In an embodiment of the present disclosure, the limiting plate is a curved plate or a flat plate;

and/or, the limiting plate and the main plate are integrally formed;

and/or, the limiting plate and the main plate are separately formed.

In an embodiment of the present disclosure, the horizontal bubble is arranged in an upper half of the main plate and positioned on a central symmetry line of the main plate.

In an embodiment of the present disclosure, a cross section of the horizontal bubble is cylindrical, and a diameter $D$ of the cross section of the horizontal bubble is at least 5 mm and at most 20 mm, or a cross section of the horizontal bubble is rectangular;

and/or, the horizontal bubble is a transparent glass tube or a transparent plastic tube.

In an embodiment of the present disclosure, the horizontal bubble includes a leveling tube and a connecting portion protruding from two ends of the leveling tube in a transverse direction. The leveling tube is filled with liquid, and an air bubble is reserved between the leveling tube and the liquid. Two position indicating lines are marked on a middle of the leveling tube at intervals.

A transverse direction of the leveling tube is parallel to a transverse direction of the main plate, and the connecting portion is respectively fixed in the clamping space defined by the clamping member and the main plate. A side surface of the clamping member facing the leveling tube abuts against an end surface of the leveling tube facing the connecting portion.

In an embodiment of the present disclosure, a cross section of the leveling tube is cylindrical, and a diameter D1 of the cross section of the leveling tube is at least 5 mm and at most 20 mm, or a cross section of the leveling tube is rectangular.

and/or, the leveling tube and the connecting portion are integrally formed;

and/or, a length L2 of the leveling tube is at least 5 mm and at most 100 mm.

In an embodiment of the present disclosure, the connecting portion is tubular and communicated with the leveling tube;

and/or, a cross section of the connecting portion is cylindrical or rectangular;

and/or, the leveling tube is a transparent glass tube or a transparent plastic tube.

In an embodiment of the present disclosure, the connecting portion is a solid structure;

and/or, the leveling tube and the connecting portion are integrally formed;

and/or, a length L2 of the leveling tube is at least 5 mm and at most 100 mm.

In an embodiment of the present disclosure, the horizontal bubble includes a leveling tube and an abutting block arranged on two ends of the leveling tube in a transverse direction. The leveling tube is filled with liquid, and an air bubble is reserved between the leveling tube and the liquid. Two position indicating lines are marked on a middle of the leveling tube at intervals.

A transverse direction of the leveling tube is parallel to a transverse direction of the main plate, and the leveling tube is fixed in the clamping space. A side surface of the clamping member facing the abutting block is abutted against an end surface of the abutting block facing the leveling tube.

In an embodiment of the present disclosure, a length L3 of the leveling tube is at least 5 mm and at most 100 mm;

and/or, a cross section of the leveling tube is cylindrical, and a diameter D2 of the cross section of the leveling tube is at least 5 mm and at most 20 mm, or a cross section of the leveling tube is rectangular;

and/or, the leveling tube is a transparent glass tube or a transparent plastic tube.

In an embodiment of the present disclosure, a cross section of the abutting block is cylindrical or rectangular;

and/or, the leveling tube and the abutting block are integrally formed.

The present disclosure further provides an air conditioner, which includes an indoor unit of an air conditioner; and an air conditioner installation plate, where the indoor unit of the air conditioner is mountable to an air conditioner installation plate as mentioned above; the air conditioner installation plate includes:

a main plate, which is provided with a clamping member on a surface of the main plate, and the clamping member and the main plate collectively define a clamping space; and a horizontal bubble, which is fixed in the clamping space and filled with liquid, and an air bubble is reserved between the horizontal bubble and the liquid;

a transverse direction of the horizontal bubble is parallel to a transverse direction of the main plate, and two position indicating lines are marked on a middle of the horizontal bubble at intervals along the transverse direction.

In the technical solution of the present disclosure, a horizontal bubble is fixed by a clamping member provided on a main plate of an air conditioner installation plate. The horizontal bubble is filled with liquid, and an air bubble is reserved between the horizontal bubble and the liquid. A transverse direction of the horizontal bubble is parallel to a transverse direction of the main plate, and two position indicating lines are marked on a middle of the horizontal bubble at intervals. The horizontal bubble is fixed by a clamping space defined by the clamping member and the main plate, so that the horizontal bubble is adjusted and moved together with the main plate as a whole during installation, and the installer only needs to determine a position relationship of the bubble in the horizontal bubble and the two position indicating lines, so as to determine whether an angle between a transverse direction of the main plate and a horizontal line is satisfied with an installation accuracy of the air conditioner installation plate in a horizontal direction. It may be ensured that the main body of the air conditioner installation plate is well installed with a good levelness by observing and keeping the bubble be between the two position indicating lines. Separate operations of the air conditioner installation plate and the measuring device in the traditional installation process are saved, and the installation may be completed by only one installer, thereby saving manpower, shortening time for leveling the air conditioner installation plate, simplifying the installation process, improving the installation accuracy, and improving the overall efficiency of air conditioner installation.

BRIEF DESCRIPTION OF THE DRAWINGS

In order to more clearly illustrate the embodiments of the present disclosure or the technical solutions in the prior art, the drawings to be used in the embodiments or the prior art description will be briefly described below. Obviously, the drawings in the following description are only certain embodiments of the present disclosure, and other drawings can be obtained according to the structures shown in the drawings without any creative work for those skilled in the art.

Figure 1:
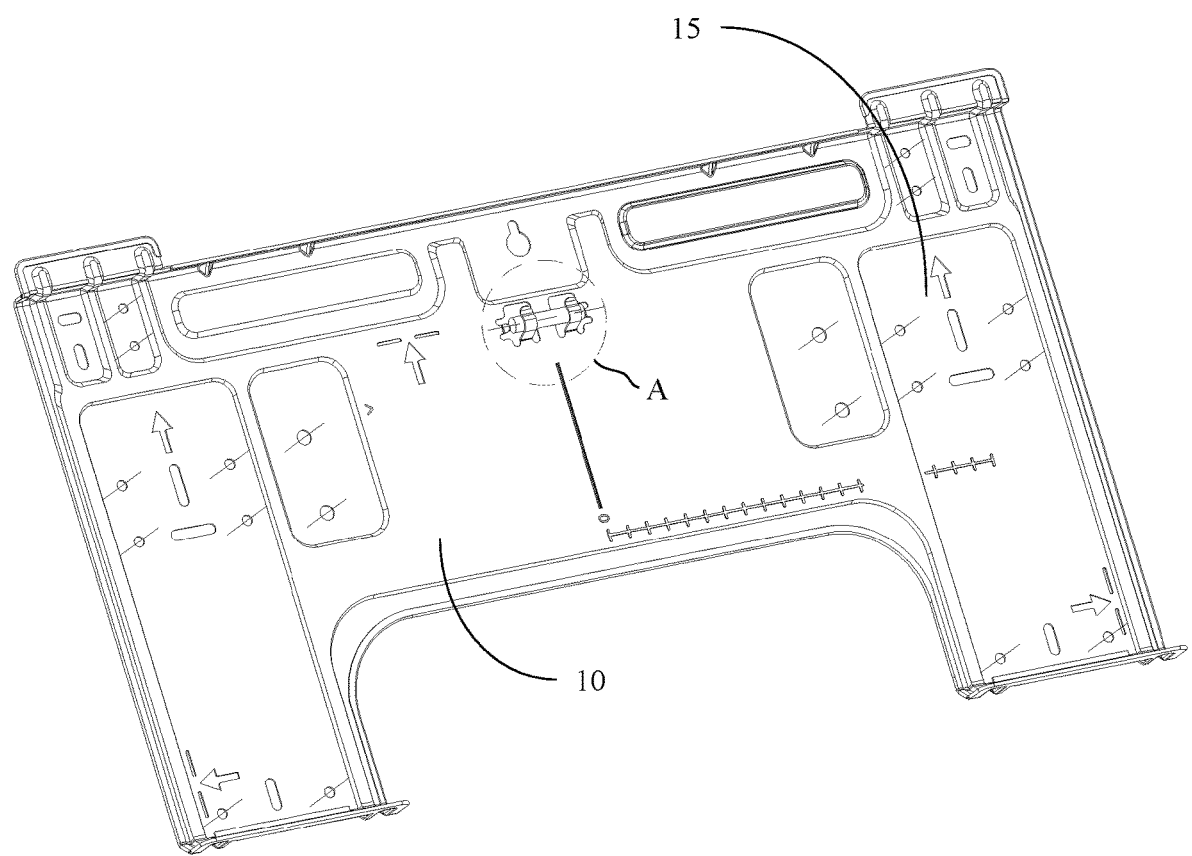
FIG. 1 is a schematic perspective view of an air conditioner installation plate according to an embodiment of the present disclosure.

Description of the reference numerals.

| Reference numeral | Name | Reference number | Name |
|---|---|---|---|
| 100 | Air conditioner installation plate | 14 | Limiting plate |
| 10 | Main plate | 15 | Assembling plate |
| 11 | Clamping member | 20 | Horizontal bubble |
| 111 | Connecting section | 21 | Air bubble |
| 112 | Clamping section | 22 | Position indicating line |
| 113 | Guiding section | A21 | Leveling tube |
| 12 | Limiting block | A22 | Connecting portion |
| 13 | Through opening | A23 | Abutting block |

The implementation, functional features and advantages of the present disclosure will be further described with reference to the accompanying drawings.

DETAILED DESCRIPTION OF THE EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of them. All other embodiments obtained by those of ordinary skill in the art based on the embodiments of the present disclosure without creative labor are within the scope of the present disclosure.

It should be noted that all directional indications (such as up, down, left, right, front, back, . . . ) in the embodiments of the present disclosure are only used to explain the relative position relation, motion, etc. of each component under a certain posture (as shown in the drawing). If the specific posture changes, the directional indication also changes accordingly.

In the present disclosure, the terms "connected", "fixed" and the like should be understood broadly, unless otherwise explicitly stated and defined. For example, "fixed" may be a fixed connection, or may be a detachable connection, or may be integrated; it may be a mechanical connection or an electrical connection; it may be directly connected or indirectly connected through an intermediate medium, and may be an internal connection of two elements or an interaction relationship of two elements unless explicitly defined otherwise. For those skilled in the art, the specific meanings of the above terms in the present disclosure can be understood on a case-by-case basis.

In addition, the descriptions of "first", "second", and the like in the present disclosure are used for descriptive purposes only, and are not to be construed as indicating or implying their relative importance or implicitly indicating the number of technical features indicated. Thus, features defining "first" or "second" may include at least one of the features, either explicitly or implicitly. In addition, the meaning of "and/or" appearing throughout the text includes three parallel schemes, taking "A and/or B" as an example, it includes the A scheme, or the B scheme, or the scheme in which both A and B are simultaneously satisfied. In addition, the technical solutions of the various embodiments may be combined with each other, but must be based on the realization of those skilled in the art, and when the combination of the technical solutions is contradictory or impossible to implement, it should be considered that the combination of the technical solutions does not exist, nor is it within the scope of protection required by the present disclosure.

Referring to FIGS. 1 to 5, the present disclosure provides an air conditioner installation plate 100.

In an embodiment of the present disclosure, the air conditioner installation plate 100 includes a main plate 10. A clamping member 11 is provided on a surface of the main plate 10. The clamping member 11 and the main plate 10 collectively define a clamping space. The air conditioner installation plate 100 further include a horizontal bubble 20, which is provided in the clamping space and filled with liquid. An air bubble 21 is reserved between the horizontal bubble 20 and the liquid. A transverse direction of the horizontal bubble 20 is parallel to a transverse direction of the main plate 10. Two position indicating lines 22 are marked on a middle of the horizontal bubble 20 at intervals along the transverse direction.

It should be noted that, the two position indicating lines 22 along the transverse direction of the horizontal bubble 20 includes a left position indicating line 22 and a right position indicating line 22. The air bubble 21 includes a left edge and a right edge, namely, the left edge of the air bubble 21 is adjacent to the left position indicating line 22, and the right edge of the air bubble 21 is adjacent to the right position indicating line 22. The left and right edges of the air bubble 21 are located between the two position indicating lines 22 when the main plate 10 is levelled. The installation accuracy of the main plate 10 is high when the distance from the left edge of the air bubble 21 to the left position indicating line 22 is substantially equal to the distance from the right edge of the air bubble 21 to the right position indicating line 22. The height of the left end of the main plate 10 is higher than the height of the right end of the main plate 10 when the distance from the left edge of the air bubble 21 to the left position indicating line 22 is smaller than the distance from the right edge of the air bubble 21 to the right position indicating line 22. The height of the left end of the main plate 10 is lower than the height of the right end of the main plate 10 when the distance from the right edge of the air bubble 21 to the right position indicating line 22 is smaller than the distance from the left edge of the air bubble 21 to the left position indicating line 22. The installation inclination angle of the main plate 10 has reached the limit when the left edge of the air bubble 21 coincides with the left position indicating line 22, or the right edge of the air bubble 21 coincides with the right position indicating line 22.

Figure 5:
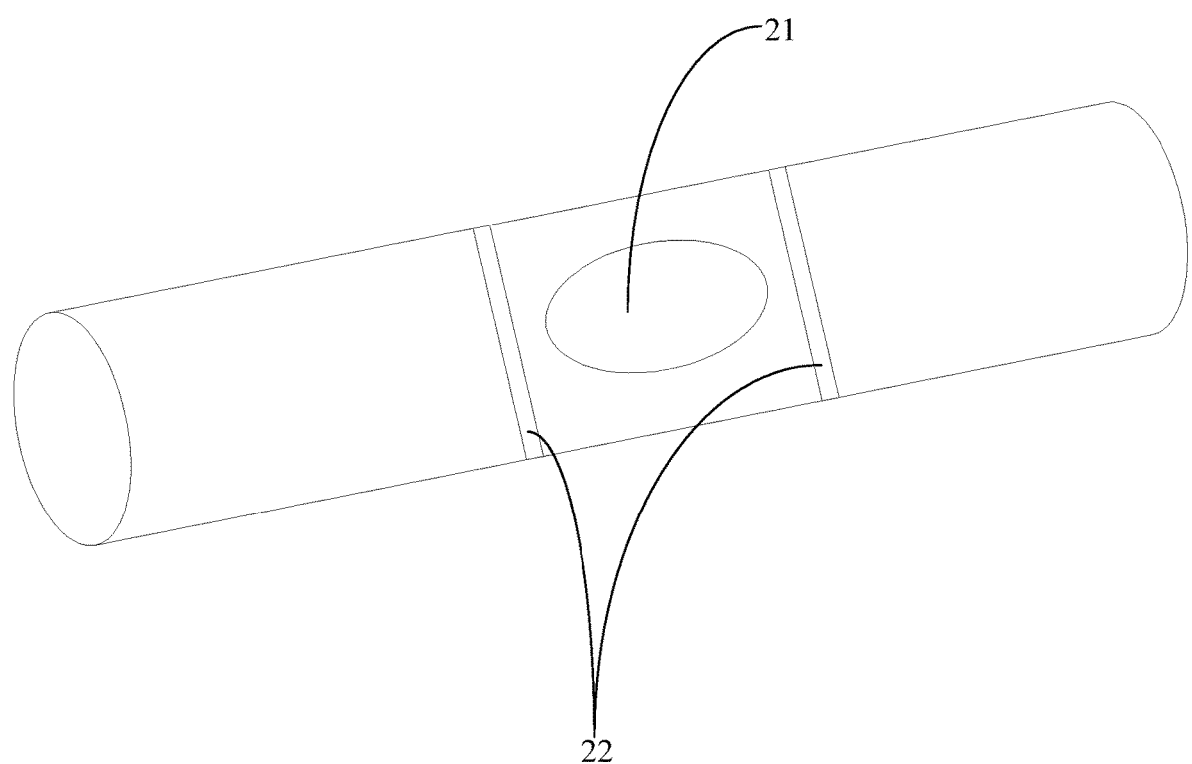
FIG. 5 is a schematic perspective view of a horizontal bubble in FIG. 1.
Figure 6:
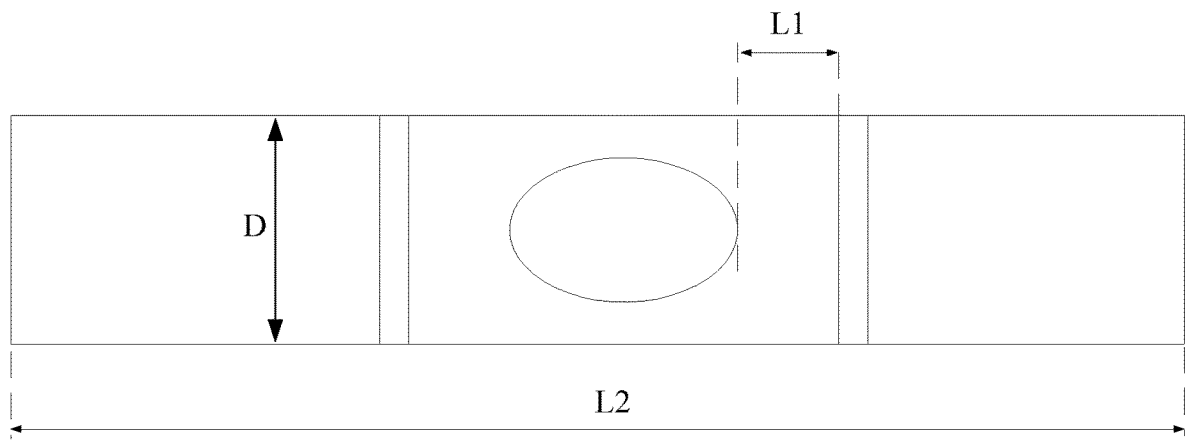
FIG. 6 is a front elevation view of the horizontal bubble in FIG. 1.
Figure 7:
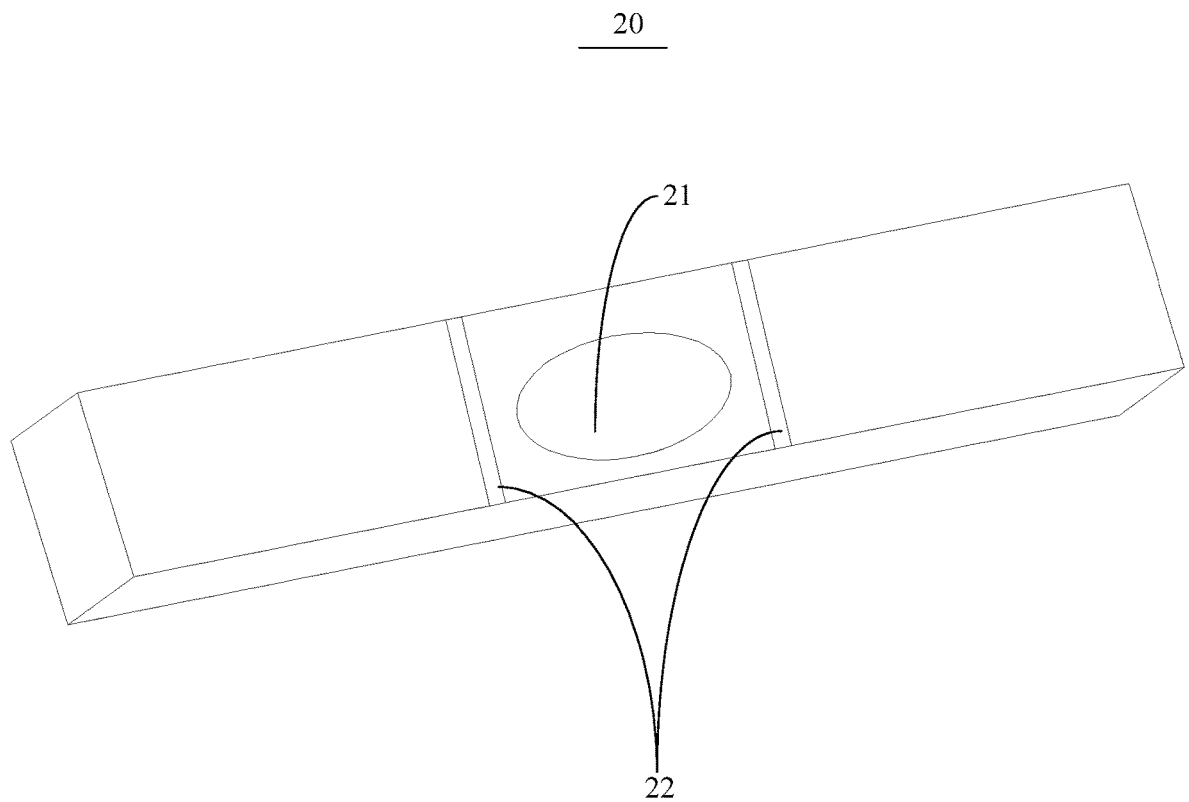
FIG. 7 is a schematic perspective view of a horizontal bubble according to another embodiment of the present disclosure.

Referring to FIGS. 5 to 7, in an embodiment of the present disclosure, a distance L1 of a side of the air bubble 21 from an adjacent position indicating line is at least 1 mm and at most 5 mm. Since the air bubble 21 is movable in the liquid, the horizontal bubble 20 tends to be levelled, namely, the main plate 10 is levelled when the air bubble 21 is located between the two position indicating lines 22. So the distance L1 is set to be at least 1 mm and at most 5 mm, so as to ensure the leveling accuracy. The distance between the two position indicating lines 22 may be overly close when the distance L1 is less than 1 mm, so that it may be difficult to adjust the air bubble 21 to be located between the two position indicating lines 22. The distance between the two position indicating lines 22 is overly far when the distance L1 is larger than 5 mm, so that the leveling accuracy cannot be ensured. Therefore, the distance L1 may be set to be at least 1 mm and at most 5 mm, such as 1 mm, 2 mm, 3 mm, 4 mm, 5 mm, or any value within the parameter range.

Figure 2:
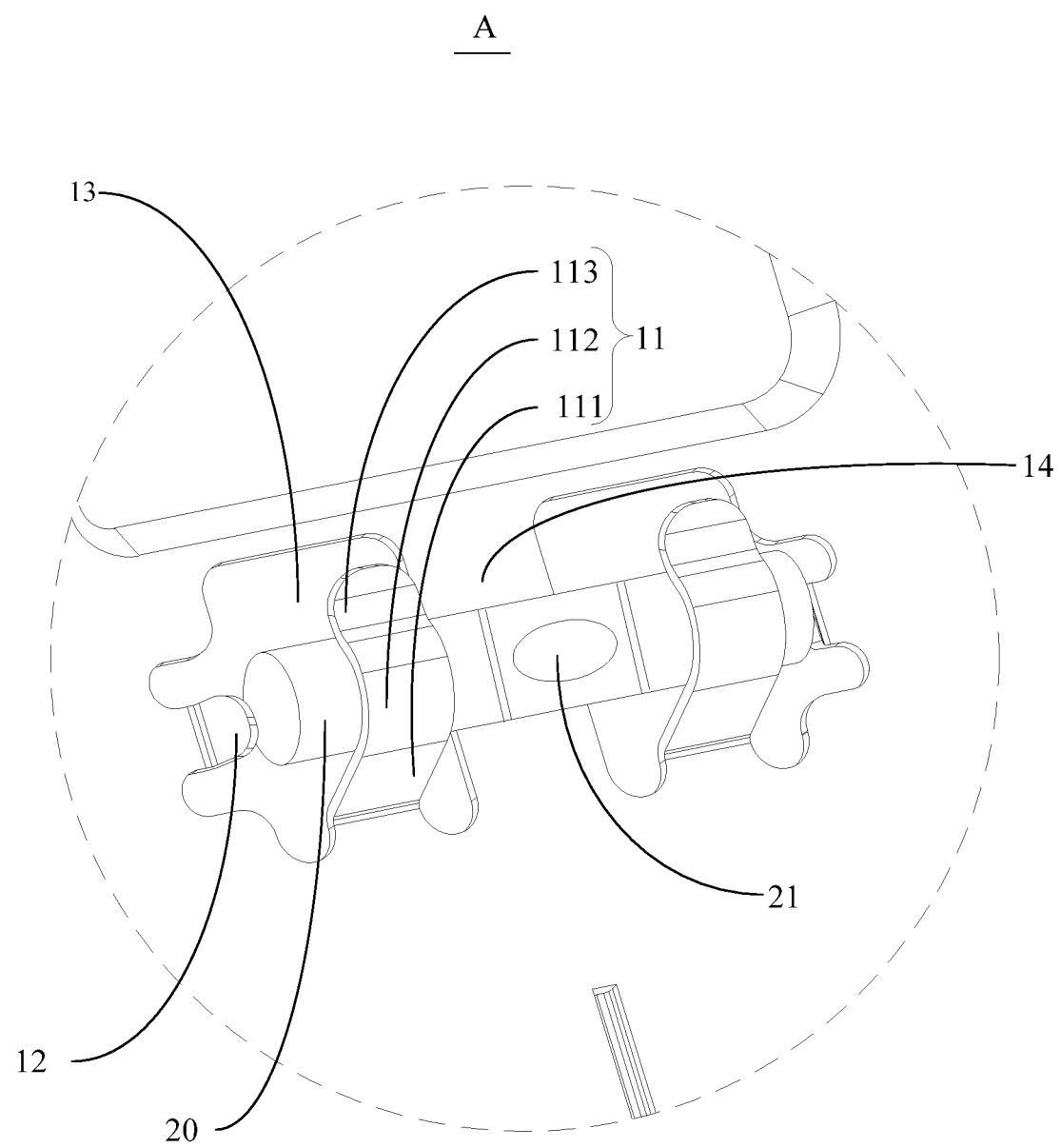
FIG. 2 is an enlarged schematic view of a portion A in FIG. 1.

Referring to FIGS. 1 and 2, in an embodiment of the present disclosure, the clamping member 11 is detachably connected to the main plate 10. Alternatively, the clamping member 11 and the main plate 10 can integrally formed. It can be understood that the clamping member 11 and the main plate 10 may be detachably fixed by a snap connection or a screw connection when they are separately formed, so that it is convenient to disassemble the clamping member 11 when it needs to be repaired and replaced. Moreover, the clamping member 11 and the main plate 10 can be separately produced and packed, so that not only the production is convenient, but also the damage of the clamping member 11 during transportation may be avoided. Alternatively, the clamping member 11 and the main plate 10 can be integrally formed to simplify the structure, so that the installation efficiency of the air conditioner installation plate 100 is improved.

In an embodiment of the present disclosure, the clamping member 11 includes a connecting section 111 and a clamping section 112. The connecting section 111 is connected to the surface of the main plate 10, and the clamping section 112 is bent and connected to a lateral side of the connecting section 111 away from the main plate 10. The connecting section 111, the clamping section 112, and the main plate 10 collectively define the clamping space. As shown in FIG. 2, namely, the connecting section 111 and the clamping section 112 may be integrally formed to enhance the overall structure thereof, so that fixing strength of the clamping member 11 when clamping the horizontal bubble 20 is ensured. An upward supporting force is provided by the connecting section 111 to support the horizontal bubble 20, and the horizontal bubble 20 is pressed against the main plate 10 by the clamping section 112, so that the horizontal bubble 20 is clamped in the clamping space.

Further, a guiding section 113 is defined on a lateral side of the clamping section 112 away from the connecting section 111, and a distance between the guiding section 113 and the main plate 10 increases gradually in a direction away from the clamping section 112. The guiding section 113 and the clamping section 112 are integrally formed to enhance the strength of the clamping member 11. The distance between the guiding section 113 and the main plate 10 increases gradually in the direction away from the clamping section 112, so that the horizontal bubble 20 may be conveniently and quickly inserted into the clamping section 112 by passing through the guiding section 113 first when installed, thereby improving the installation efficiency. After being installed into the clamping space, the horizontal bubble 20 is hard to be pulled upwards due to the coordination of the guiding section 113 and the main plate 10, thereby stabilizing the horizontal bubble in the clamping space.

Optionally, the clamping section 112 has an arc shape, and the arc shape is curved along a direction away from the main plate 10, so that the clamping section 112 not only stably abuts against the horizontal bubble 20 but also has a smoothly transition fit with the horizontal bubble 20 when the clamping section 112 is clamped in the clamping space.

The clamping section 112 is defined in the arc shape, so that danger to the installer is avoided during installation. It should be noted that the shape of the clamping member 11 may be selected according to a specific situation by a person skilled in the art, and details are not repeatedly described herein.

Figure 3:
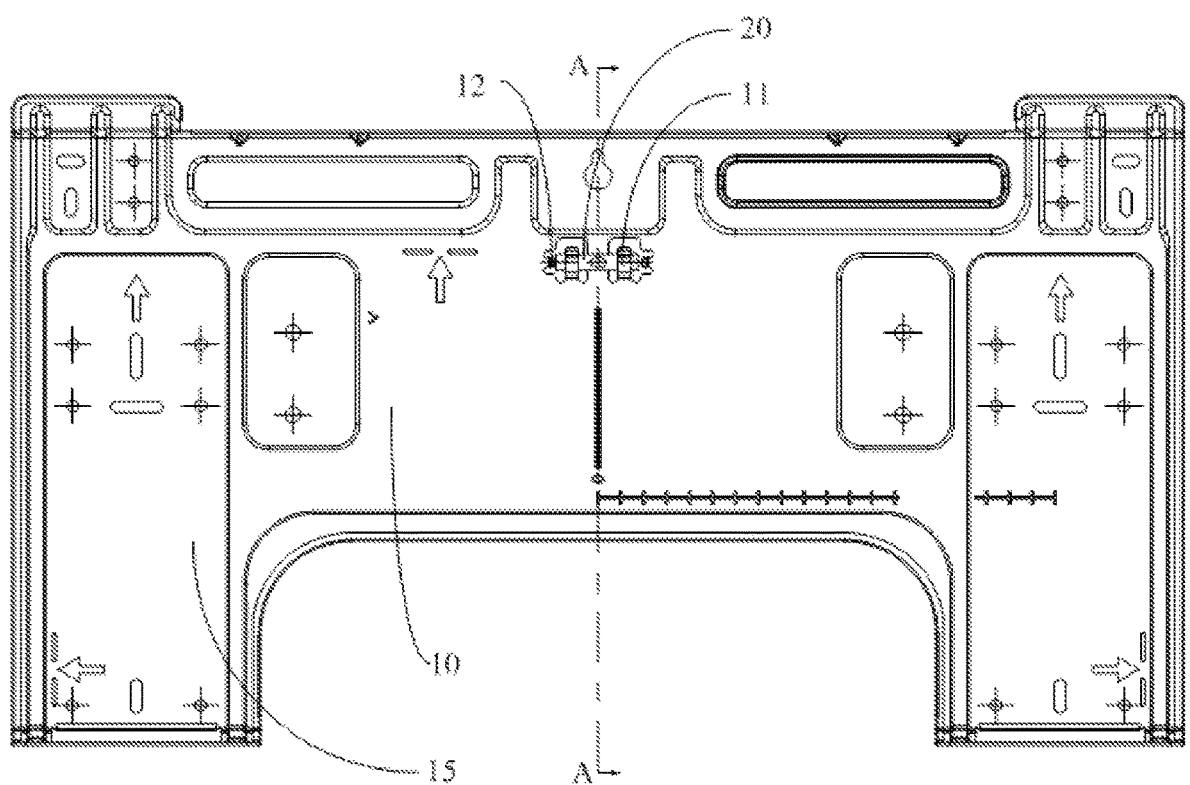
FIG. 3 is a front elevation view of the air conditioner installation plate of the present disclosure.
Figure 3:
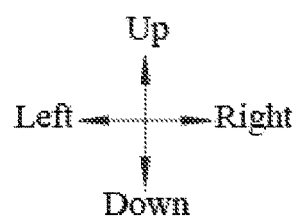
Figure 4:
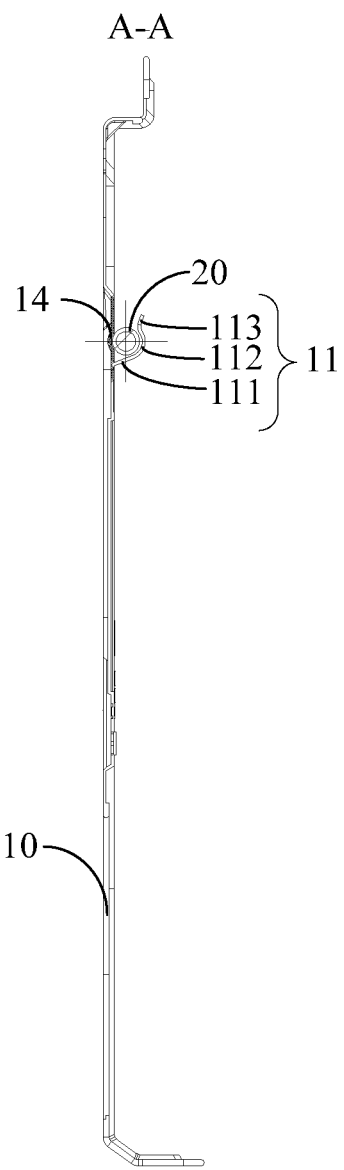
FIG. 4 is a sectional view of the air conditioner installation plate shown in FIG. 3 along the lines A-A.

In an embodiment of the present disclosure, as shown in FIGS. 1 to 3, the main plate 10 further includes two limiting blocks 12, which are connected to the main plate 10 and respectively abutted against an end of the horizontal bubble 20 along the transverse direction. The two limiting blocks 12 are respectively abutted against an end of the horizontal bubble 20 along the transverse direction after the installation of the horizontal bubble 20, so that the movement of the horizontal bubble 20 in the left-right direction is further restricted. Moreover, the two limiting blocks 12 and the main plate 10 may be integrally formed, so as to further improve the locking fastness of the horizontal bubble 20 after installation, thereby improving the structural strength when abutting. In an embodiment of the present disclosure, the limiting block 12 may be bent and connected to the main plate 10, so as to facilitate the installation and removal of the horizontal bubble 20. It should be noted that the shape of the limiting block 12 may be selected according to actual conditions, and details are not described herein again.

Further, an auxiliary fastening member (not shown) is further defined between the two clamping members 11, and the auxiliary fastening member is connected to the main plate 10 and defines an auxiliary fastening space with the main plate 10. It can be understood that the horizontal bubble 20 may be further fixed on the main plate 10 by the auxiliary fastening space to enhance the stability. For example, the auxiliary fastening member may be a claw clamped on the horizontal bubble 20, and the claw is fixed on the main plate 10 by the screw, thereby ensuring the overall stability of the horizontal bubble 20 after installation. Certainly, the auxiliary fastening member may also be fixed by other means, which is not limited herein.

Referring to FIG. 2, in an embodiment of the present disclosure, a number of the clamping member 11 is two, and the two clamping members 11 are defined at intervals along the transverse direction of the horizontal bubble 20. The two ends of the horizontal bubble 20 are respectively restricted in the up-down direction by the arrangement of the two clamping members 11. For example, as shown in FIG. 2, one of the clamping members 11 is defined adjacent to the left end of the horizontal bubble 20, and another clamping member 11 is defined adjacent to the right end of the horizontal bubble 20. It can be understood that, in other embodiments, a plurality of the clamping members 11 may also be defined, such as three or four, and the plurality of clamping members 11 may be evenly defined at intervals on the main plate 10, so that the horizontal bubble 20 is stably clamped.

Referring to FIG. 1 and FIG. 2, in an embodiment of the present disclosure, the main plate 10 defines a through opening 13 corresponding to each of the clamping members 11, and a limiting plate 14 configured to abut against the horizontal bubble 20 is defined between the two through openings 13. It can be understood that, the through opening 13 is defined, so that when the horizontal bubble 20 is disassembled, the horizontal bubble 20 may be taken out not only by directly pushing upward the horizontal bubble 20 out of the clamping member 11, but also by pushing upward the horizontal bubble 20 out of the clamping space from the through opening 13. The material of the limiting plate 14 may be an elastic material such as silica gel or rubber. The horizontal bubble 20 is pressed from the top down and the limiting plate 14 is elastically deformed after being pressed, and the horizontal bubble 20 is clamped after being smoothly inserted into the clamping space when the limiting plate 14 returns back and provide a forward pressure, so that the horizontal bubble 20 does not loosen from the clamping space, thereby improving the firmness of the fixation.

Further, the limiting plate 14 is a curved plate or a flat plate or other regular shapes, so that the levelness of the horizontal bubble 20 shall not be affected when the horizontal bubble 20 is abutted against the limiting plate 14, thereby ensuring the leveling accuracy of the measurement.

Optionally, the limiting plate 14 and the main plate 10 are integrally formed, so that the overall strength of the limiting plate 14 and the main plate 10 is ensured, and the additional installation time is reduced, thereby improving the installation efficiency.

Optionally, the limiting plate 14 and the main plate 10 are separately formed and may be detachably fixed by a snap connection or a screw connection, so that it is convenient to disassemble the limiting plate 14 when it needs to be repaired and replaced. Moreover, the limiting plate 14 and the main plate 10 are separately produced and packed, so that not only the production is convenient, but also the damage of the limiting plate 14 during transportation may be avoided.

Referring to FIG. 1 and FIG. 3, in an embodiment of the present disclosure, the horizontal bubble 20 is defined in an upper half of the main plate 10 and positioned on a central symmetry line of the main plate 10; the main plate 10 defines an assembling plate 15 at two ends, and the assembling plate 15 and the main plate 10 may be integrally formed for easy production. The assembling plate 15 is configured to fix two ends of the body of the indoor unit of the air conditioner. The horizontal bubble 20 is defined in the upper half of the main plate 10, so that the horizontal bubble 20 will not be touched when installing the indoor unit of the air conditioner. The horizontal bubble 20 is positioned on the central symmetry line of the main plate 10, so that the levelness of the main plate 10 at the central symmetry line may be detected by the horizontal bubble 20, thereby improving the measurement accuracy.

Referring to FIGS. 5 to 7, in an embodiment of the present disclosure, a cross section of the horizontal bubble 20 is cylindrical, and a diameter D of the cross section of the horizontal bubble 20 is at least 5 mm and at most 20 mm, or a cross section of the horizontal bubble 20 is rectangular. When the horizontal bubble 20 is in a shape of a cylindrical strip, the diameter D of the cross section of the horizontal bubble 20 in the transverse direction is at least 5 mm and at most 20 mm; the amount of liquid that can be accommodated may be overly small if the diameter of the horizontal bubble 20 is less than 5 mm, so that the air bubble 21 is overly small to be observed. The horizontal bubble 20 may be overly large and occupy much space if the diameter of the horizontal bubble 20 is larger than 20 mm, so that the utilization efficiency of the space is reduced. Therefore, the diameter D of the cross section of the horizontal bubble 20 may be set to be at least 5 mm and at most 20 mm, such as 5 mm, 10 mm, 15 mm, 20 mm, 25 mm, 30 mm. It should be noted that the value of the diameter D may be selected according to an actual situation by a person skilled in the art, and details are not described herein again. Further, a cross section of the horizontal bubble 20 may be rectangle, so that the movement of the air bubble 21 may be more intuitively observed by the installer, thereby improving the leveling accuracy of the horizontal bubble 20.

Alternatively, the horizontal bubble 20 is a transparent glass tube or a transparent plastic tube, so that the positional information of the air bubble 21 in the liquid may be clearly observed.

Figure 8:
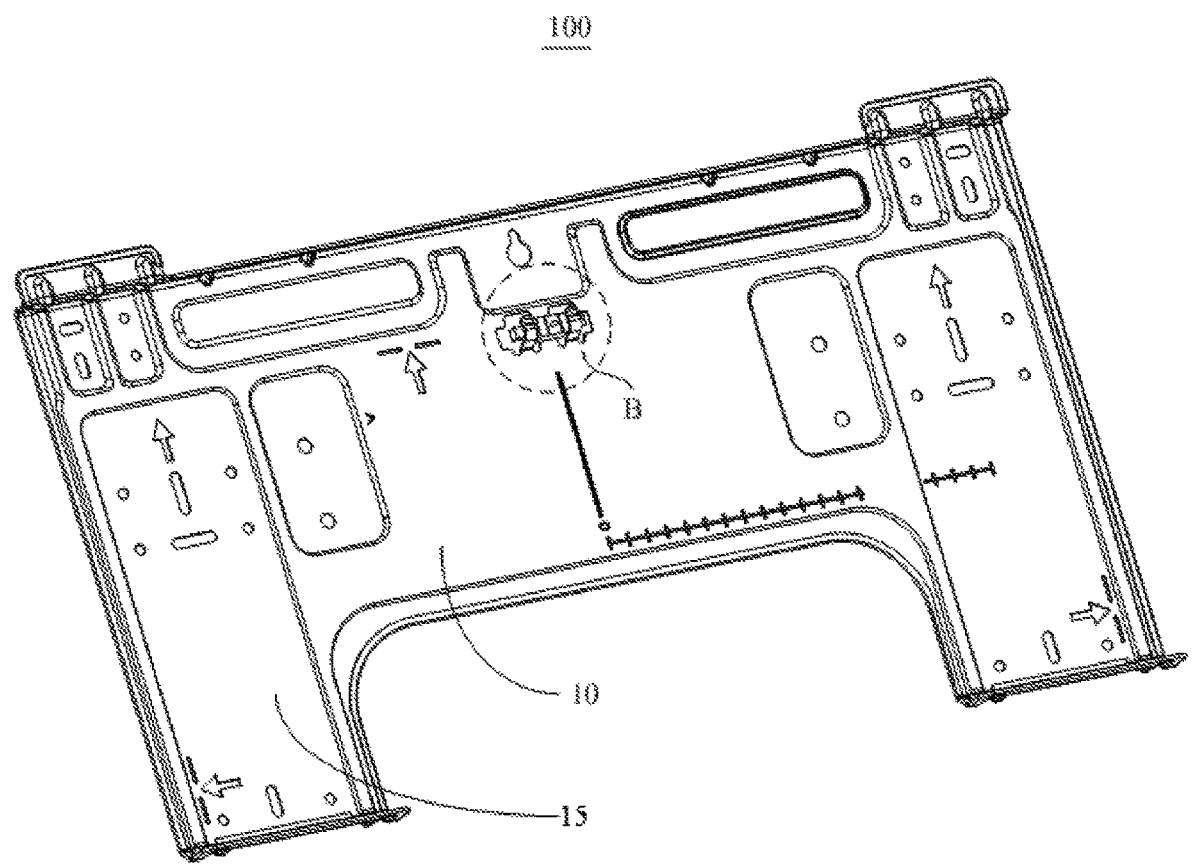
FIG. 8 is a schematic perspective view of an air conditioner installation plate according to another embodiment of the present disclosure.
Figure 9:
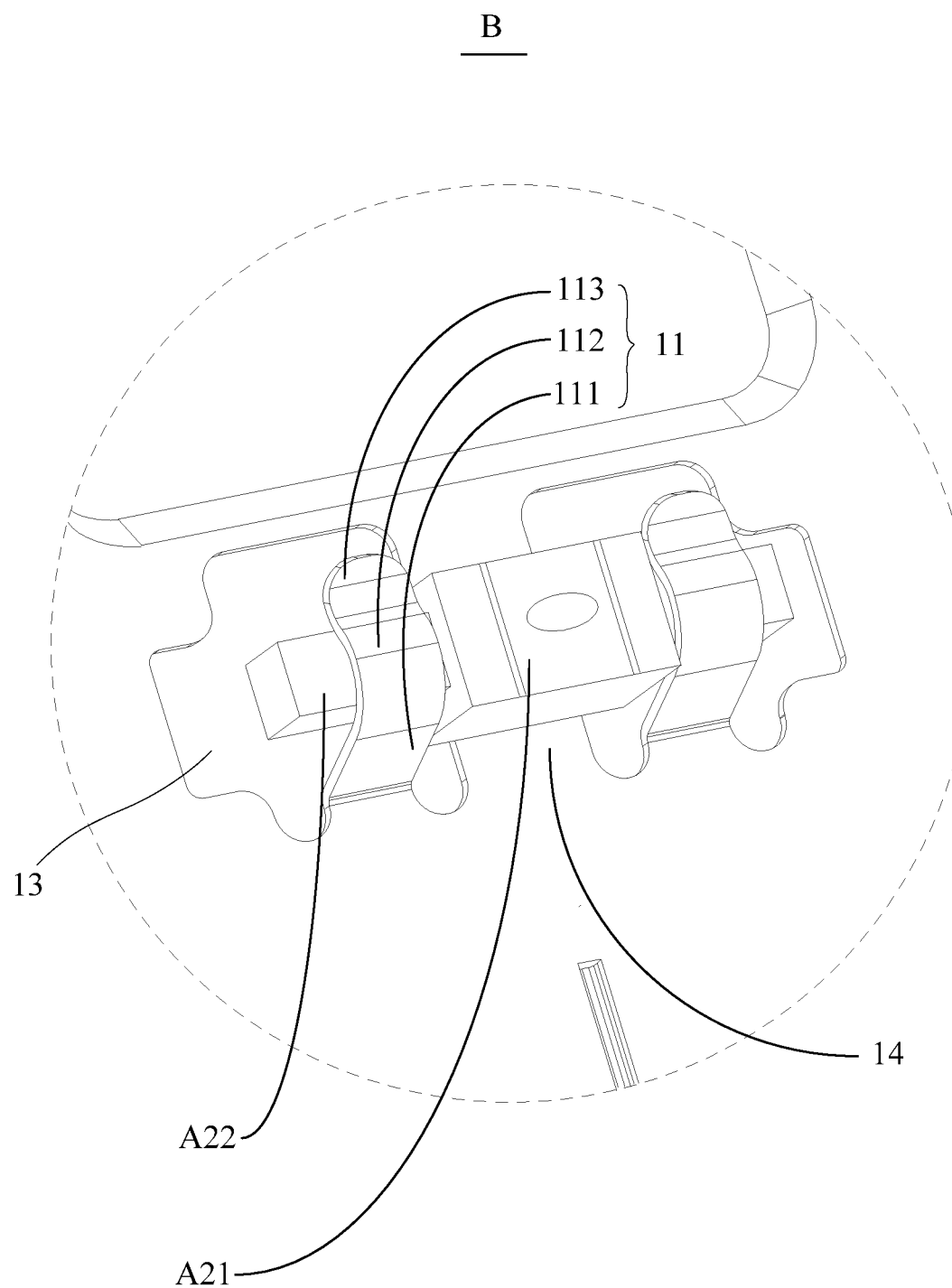
FIG. 9 is an enlarged schematic view of a portion B in FIG. 8.
Figure 10:
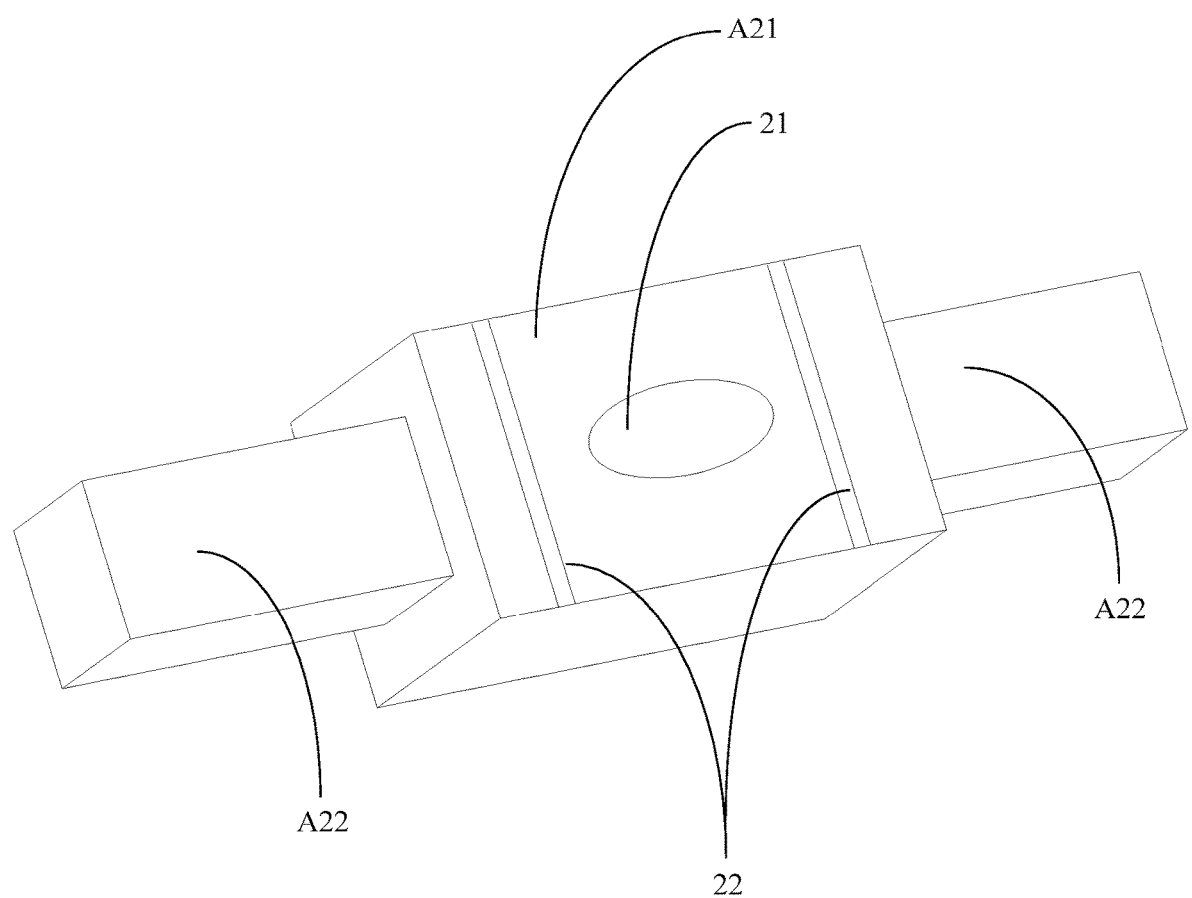
FIG. 10 is a perspective view of an assembly of a horizontal bubble in FIG. 8.

In an embodiment of the present disclosure, with reference to FIGS. 8 to 10, the horizontal bubble 20 includes a leveling tube A21 and a connecting portion A22 protruding from two ends of the leveling tube A21 in a transverse direction. The leveling tube A21 is filled with liquid, and an air bubble 21 is reserved between the leveling tube A21 and the liquid. Two position indicating lines 22 are marked on a middle of the leveling tube A21 at intervals.

A transverse direction of the leveling tube A21 is parallel to a transverse direction of the main plate 10, and the connecting portion A22 is respectively fixed in the clamping space defined by the clamping member 11 and the main plate 10. A side surface of the clamping member 11 facing the leveling tube A21 abuts against an end surface of the leveling tube A21 facing the connecting portion A22.

Optionally, the connecting portion A22 is located in the clamping space, so that the movements of the horizontal bubble 20 in the up-down and front-rear directions are restricted. The side surface of the clamping member 11 facing the leveling tube A21 abuts against the end surface of the leveling tube A21 facing the connecting portion A22, so that the movement of the leveling tube A21 in the left-right direction is restricted, so that the horizontal bubble 20 shall not move in the up-down, front-rear, and left-right directions when moving the air conditioner installation plate 100, so that the leveling accuracy shall not be affected. The axes of the two connecting portions A22 may be coincident along the direction of the leveling tube A21, so that it is convenient to install the air conditioner installation plate 100 and the test accuracy is ensured when the two connecting portions A22 are fixed in the clamping space. In addition, the clamping member 11 may be an integral structure with two lugs connected thereto, and the connecting portions A22 at two ends of the leveling tube A21 are respectively fixed to the main plate 10 through the two lugs, or, two lugs may be independently defined on the main plate 10, so as to independently fix the connecting portions A22 at two ends of the leveling tube A21 to the main plate 10. It should be noted that a person skilled in the art may make a selection according to the actual situation, and details are not described herein again.

Therefore, the horizontal bubble 20 is fixed by defining the clamping member 11 on the main plate 10 of the air conditioner installation plate 100. The horizontal bubble 20 includes the leveling tube A21 and the connecting portion A22 protruding from two ends of the leveling tube A21 in the transverse direction. The leveling tube A21 contains liquid and the air bubble 21, and the transverse direction of the leveling tube A21 is parallel to the transverse direction of the main plate 10; the connecting portion A22 is clamped in the clamping space, and the leveling tube A21 is exposed to the environment, so that the position of the air bubble 21 in the leveling tube A21 may be easily observed by the installer, so as to determine whether an angle between the transverse direction of the main plate 10 and the horizontal line is satisfied with an installation accuracy of the air conditioner installation plate 100 in a horizontal direction, thereby simplifying the installation process and ensuring the installation accuracy, and improving the overall working efficiency of the installation of the air conditioner. Moreover, the connecting portion A22 is fixed by the clamping space defined by the clamping member 11 and the main plate 10, so that the movements of the horizontal bubble 20 on the main plate 10 in the up-down and front-rear directions are restricted by the clamping space. The side surface of the clamping member 11 facing the leveling tube A21 abuts against the end surface of the leveling tube A21 facing the connecting portion A22, so that the movement of the horizontal bubble 20 on the main plate 10 in the left-right direction is restricted, thereby ensuring the overall stability of horizontal bubble 20 installed on main plate 10, and improving the accuracy of measurement.

Figure 11:
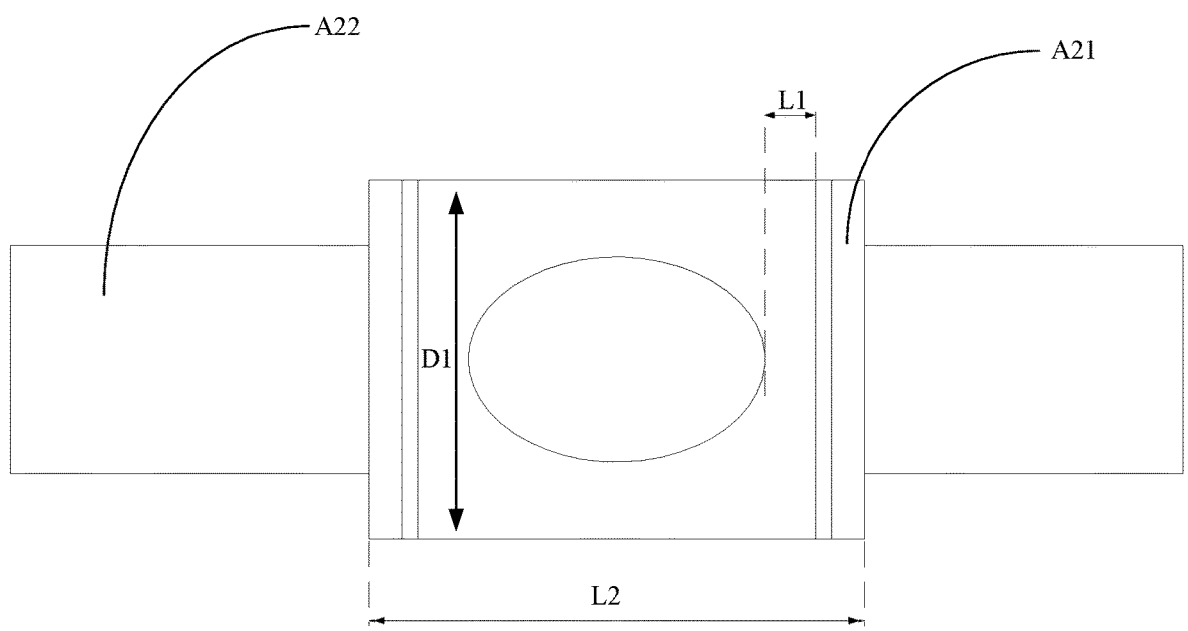
FIG. 11 is a front elevation view of the horizontal bubble in FIG. 8.

Further, referring to FIG. 11, a cross section of the leveling tube A21 is cylindrical, and a diameter D1 of the cross section of the leveling tube A21 is at least 5 mm and at most 20 mm, or a cross section of the leveling tube A21 is rectangular. When the leveling tube A21 is in the shape of a cylindrical strip, the diameter D1 of the cross section of the leveling tube A21 in the transverse direction is at least 5 mm and at most 20 mm. The amount of liquid that can be accommodated may be overly small if the diameter of the leveling tube A21 is less than 5 mm, so that the air bubble 21 is overly small to be observed. The leveling tube A21 may be overly large and occupy much space if the diameter of the leveling tube A21 is larger than 20 mm, so that the utilization efficiency of the space is reduced. Therefore, the diameter D1 of the cross section of the leveling tube A21 may be set to be at least 5 mm and at most 20 mm, such as 5 mm, 10 mm, 15 mm, 20 mm, 25 mm, 30 mm. It should be noted that the value of the diameter D1 may be selected according to an actual situation according to a person skilled in the art, and details are not described herein again. Further, a cross section of the leveling tube A21 may be rectangular, so that the movement of the air bubble 21 may be more intuitively observed by the installer, thereby improving the leveling accuracy of the horizontal bubble 20.

Optionally, the connecting portion A22 is tubular and communicated with the leveling tube A21; namely, the connecting portion A22 may be an elongated structure such as a tubular structure, so that it is uniformly stressed and the leveling accuracy of the horizontal bubble 20 is ensured. The connecting portion A22 may further be a hollow structure to be communicated with the leveling tube A21, so as to accommodate more liquid.

Figure 12:
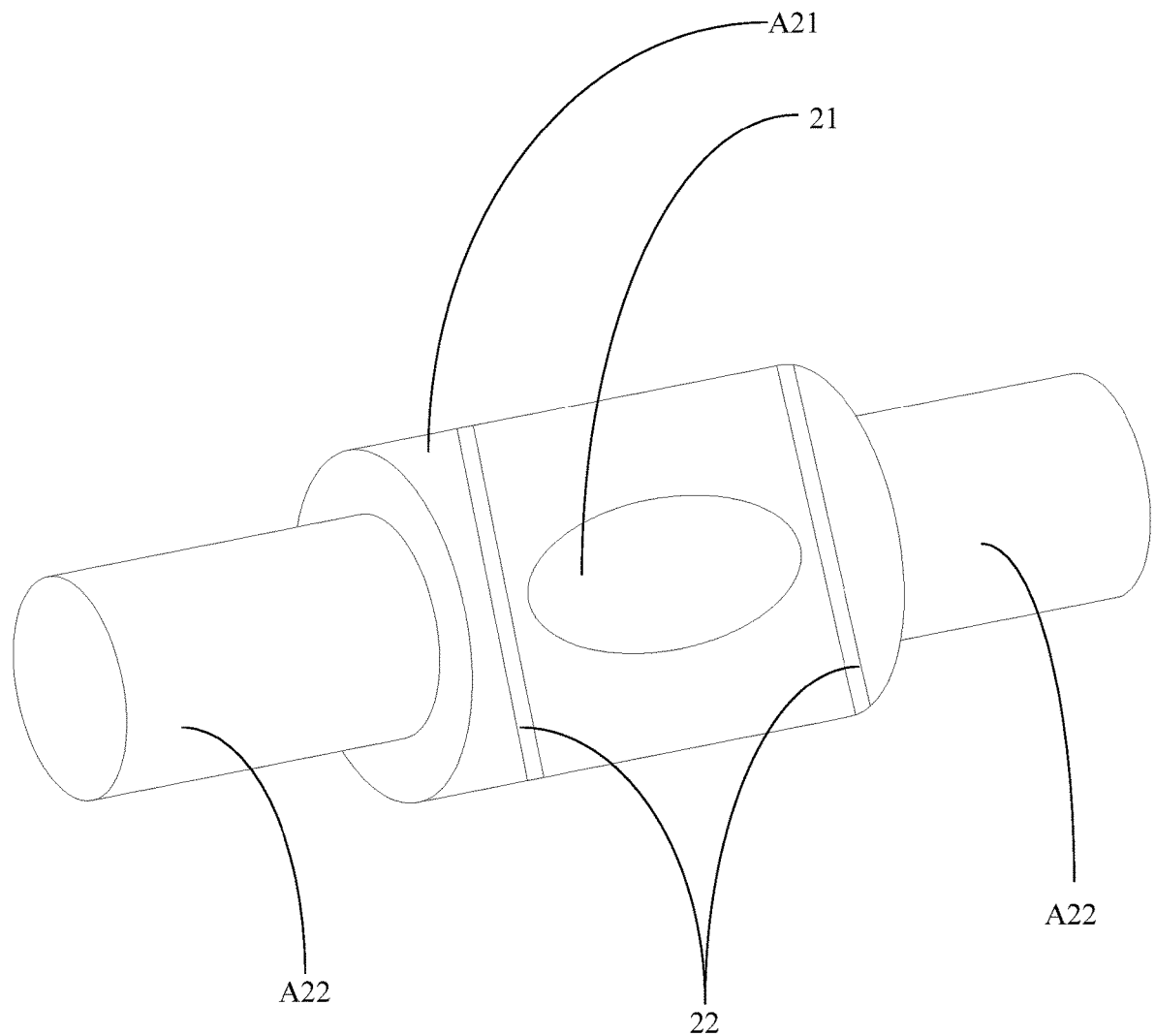
FIG. 12 is a schematic perspective view of the horizontal bubble in FIG. 8 according to another embodiment.

Optionally, referring to FIGS. 10 to 12, a cross section of the connecting portion A22 is cylindrical or rectangular. A cross section of the connecting portion A22 is regular, so that the connecting portion A22 is more uniformly stressed, thereby ensuring the leveling accuracy of the horizontal bubble 20.

Optionally, the leveling tube A21 is a transparent glass tube or a transparent plastic tube. Namely, the leveling tube A21 is made of transparent glass material or a transparent plastic material, so that the position of the air bubble 21 in the liquid may be clearly observed.

Optionally, the connecting portion A22 is a solid structure. The connecting portion A22 may also be a solid structure, so that it may have a large hardness, thereby ensuring the stability during installation.

Optionally, the leveling tube A21 and the connecting portion A22 are integrally formed, which not only improves the strength of the overall structure, but also ensures the stability of the horizontal bubble 20 when installed, and reduces the additional installation time and improves the efficiency of the overall installation.

Optionally, referring to FIG. 11, a length L2 of the leveling tube A21 is at least 5 mm and at most 100 mm the length of the leveling tube A21 may be overly small if the length of the leveling tube A21 is less than 5 mm, so that it may be difficult to make the air bubble 21 to have a small movement. The length of the leveling tube A21 may be overly large if the length is larger than 100 mm, so that the overall utilization rate is low. Therefore, the length L2 of the leveling tube A21 may be set, for example, to 5 mm, 10 mm, 15 mm, 20 mm, 25 mm, 30 mm, or any value within the parameter range.

Figure 13:
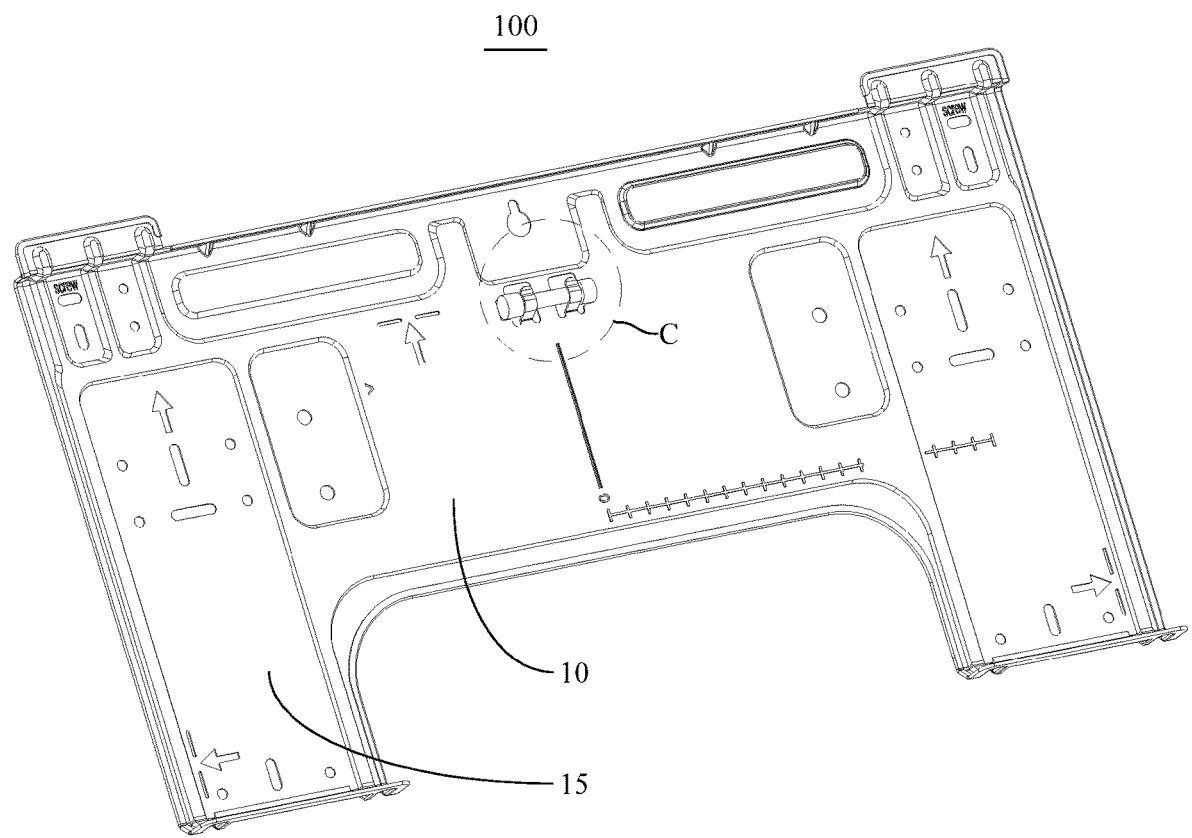
FIG. 13 is a schematic perspective view of an air conditioner installation plate according to still another embodiment of the present disclosure.
Figure 14:
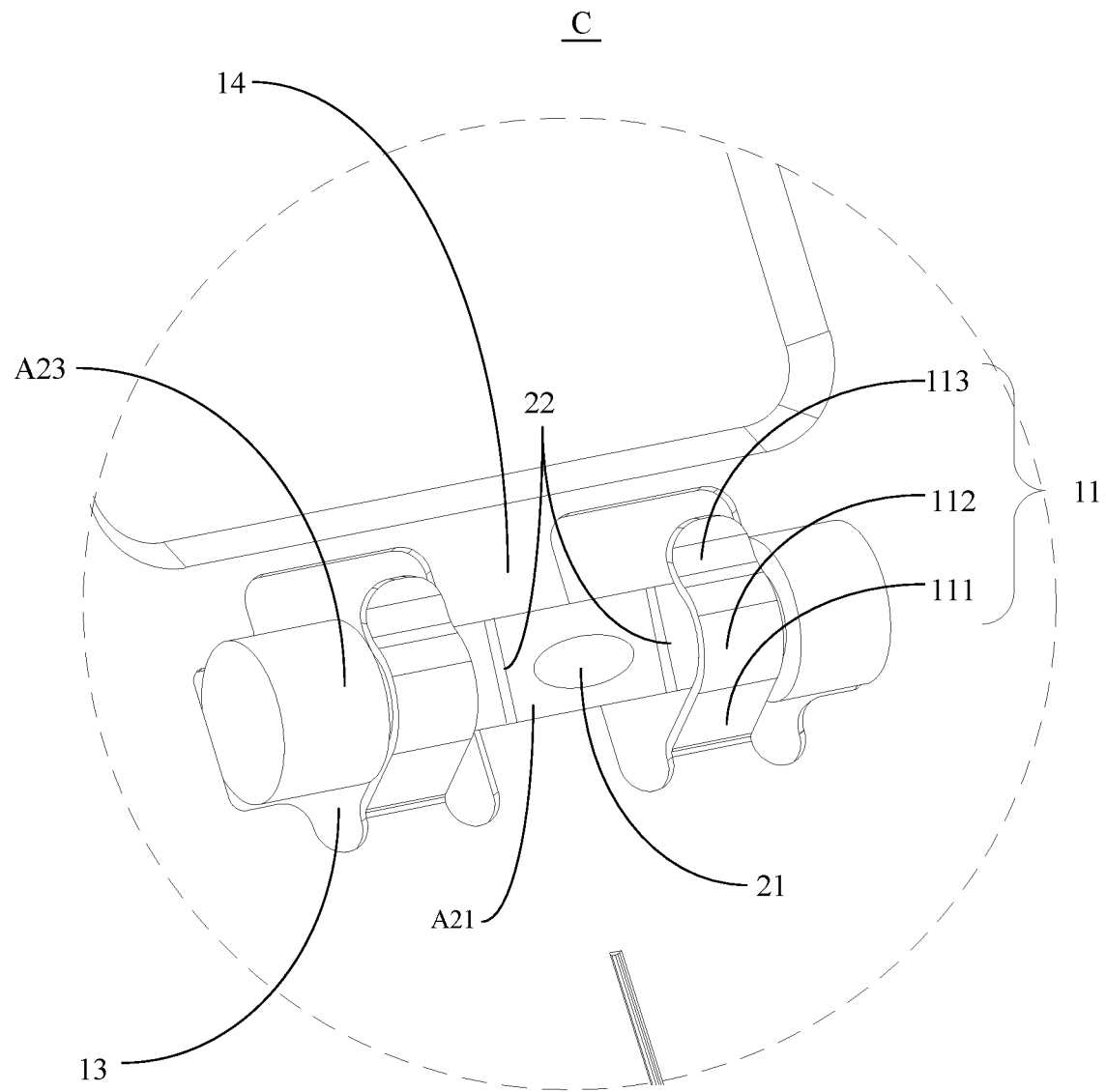
FIG. 14 is an enlarged schematic view of a portion C in FIG. 13.
Figure 15:
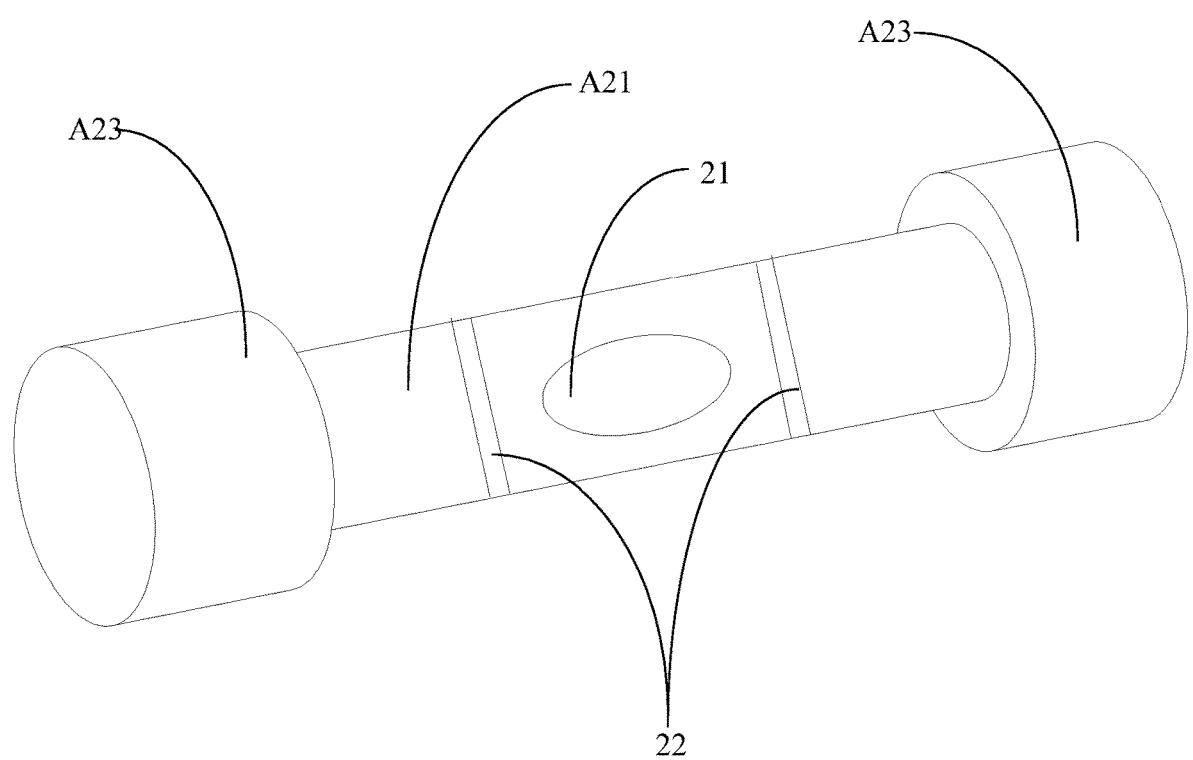
FIG. 15 is a perspective view of an assembly of a horizontal bubble in FIG. 13.

In another embodiment of the present disclosure, with reference to FIGS. 13-15, the horizontal bubble 20 includes a leveling tube A21 and an abutting block A23 defined on two ends of the leveling tube A21 in a transverse direction. The leveling tube A21 is filled with liquid, and an air bubble 21 is reserved between the leveling tube A21 and the liquid. Two position indicating lines 22 are marked on a middle of the leveling tube A21 at intervals.

A transverse direction of the leveling tube A21 is parallel to a transverse direction of the main plate 10, and the leveling tube A21 is fixed in the clamping space. A side surface of the clamping member 11 facing the abutting block A23 is abutted against an end surface of the abutting block A23 facing the leveling tube A21.

It should be noted that the abutting block A23 may also be a solid structure, so that it may have a large hardness, or the abutting block A23 may further be a hollow structure to be communicated with the leveling tube A21, so as to accommodate more liquid. When the side surface of the clamping member 11 facing the abutting block A23 is abutted against the end surface of the abutting block A23 facing the leveling tube A21, the movement of the horizontal bubble 20 in the left-right direction is restricted by the clamping member 11. An auxiliary limiting member is independently defined on the main plate 10 at two opposite ends of the two abutting blocks A23 if the two abutting blocks A23 are not abutted against the clamping member 11, so as to restrict the movement of the horizontal bubble 20 in the left-right direction, so that the horizontal bubble 20 shall not move in the left-right direction when moving the air conditioner installation plate 100, so that the leveling accuracy shall not be affected.

Therefore, the horizontal bubble 20 is fixed by the clamping member 11 defined on the main plate 10 of the air conditioner installation plate 100. The horizontal bubble 20 includes the leveling tube A21 and the abutting block A23 defined on two ends of the leveling tube A21 in the transverse direction. The leveling tube A21 contains liquid and the air bubble 21, and the transverse direction of the leveling tube A21 is parallel to the transverse direction of the main plate 10; the leveling tube A21 is fixed by the clamping space defined by the clamping member 11 and the main plate 10, so that the horizontal bubble 20 is adjusted and moved together with the main plate 10 as a whole during installation, and the position of the air bubble 21 in the leveling tube A21 may be easily observed by the installer, so as to determine whether an angle between the transverse direction of the main plate 10 and the horizontal line is satisfied with an installation accuracy of the air conditioner installation plate 100 in a horizontal direction, thereby simplifying the installation process and ensuring the installation accuracy, and improving the overall working efficiency of the installation of the air conditioner. Moreover, the connecting portion A22 is fixed by the clamping space defined by the clamping member 11 and the main plate 10, so that the movements of the horizontal bubble 20 on the main plate 10 in the up-down and front-rear directions are restricted by the clamping space. The side surface of the clamping member 11 facing the abutting block A23 is abutted against the end surface of the abutting block A23 facing the leveling tube A21, so that the movement of the horizontal bubble 20 on the main plate 10 in the left-right direction is restricted, thereby ensuring the stability of horizontal bubble 20 installed on main plate 10, and the accuracy of measurement.

Figure 16:
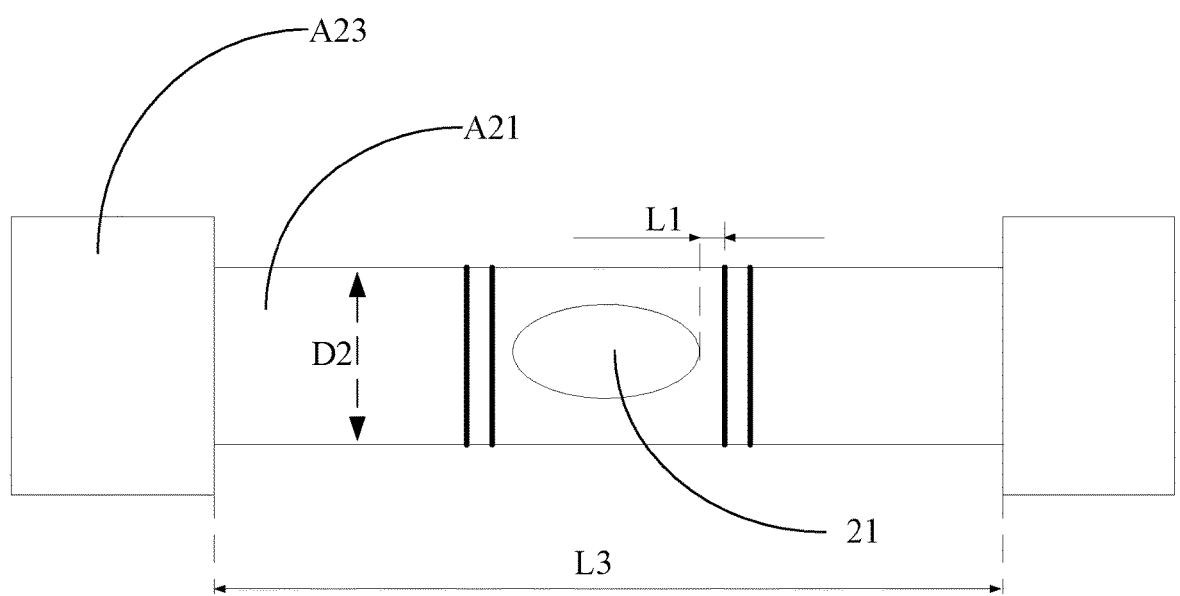
FIG. 16 is a front elevation view of the horizontal bubble in FIG. 13.

Further, referring to FIG. 15 and FIG. 16, a length L3 of the leveling tube A21 is at least 5 mm and at most 100 mm; the length of the leveling tube A21 is overly small if the length is less than 5 mm, so that it may be difficult to make the air bubble 21 to have a small movement. The length of the leveling tube A21 may be overly large if the length is larger than 100 mm, so that the overall utilization rate is low and unnecessary waste is caused. Therefore, the length L3 of the leveling tube A21 may be set, for example, to 5 mm, 10 mm, 15 mm, 20 mm, 25 mm, 30 mm, or any value within the parameter range.

Optionally, referring to FIG. 16, a cross section of the leveling tube A21 is cylindrical, and a diameter D2 of the cross section of the leveling tube A21 is at least 5 mm and at most 20 mm, or a cross section of the leveling tube A21 is rectangular. When the leveling tube A21 is in the shape of a cylindrical strip, the diameter D2 of the cross section of the leveling tube A21 in the transverse direction is at least 5 mm and at most 20 mm. The amount of liquid that can be accommodated may be overly small if the diameter of the leveling tube A21 is less than 5 mm, so that the air bubble 21 is overly small to be observed. The leveling tube A21 may be overly large and occupy much space if the diameter of the leveling tube A21 is larger than 20 mm, so that the utilization efficiency of the space is reduced. Therefore, the diameter D2 of the cross section of the leveling tube A21 is set to be at least 5 mm and at most 20 mm, such as 5 mm, 10 mm, 15 mm, 20 mm, 25 mm, 30 mm. It should be noted that the value of the diameter D2 may be selected according to an actual situation according to a person skilled in the art, and details are not described herein again. Further, a cross section of the leveling tube A21 may be rectangular, so that the movement of the air bubble 21 may be more intuitively observed by the installer, thereby improving the leveling accuracy of the horizontal bubble 20.

Optionally, the leveling tube A21 is a transparent glass tube or a transparent plastic tube. Namely, the leveling tube A21 is made of transparent glass material or a transparent plastic material, so that the position of the air bubble 21 in the liquid may be clearly observed.

Figure 17:
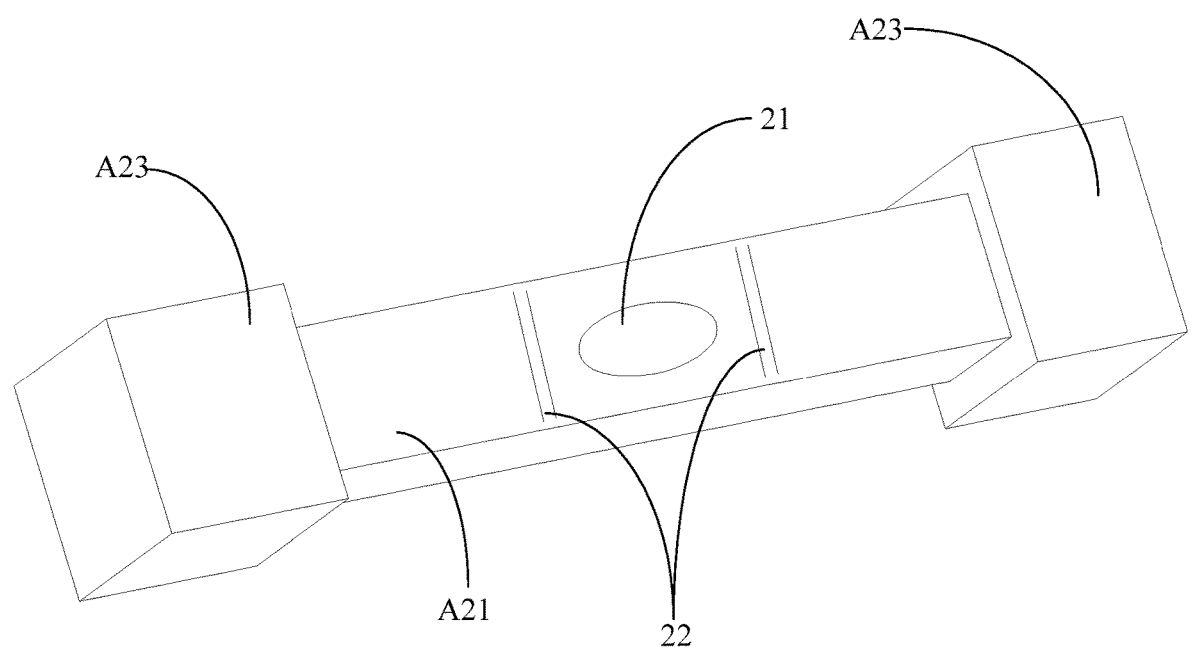
FIG. 17 is a schematic perspective view of the horizontal bubble in FIG. 13 according to another embodiment.

Optionally, referring to FIGS. 15 to 17, a cross section of the abutting block A23 can be cylindrical or rectangular. A cross section of the abutting block A23 is regular, so that the force of the abutting block A23 is more uniformly stressed, thereby ensuring the installation is more convenient and the leveling accuracy of the horizontal bubble 20.

Optionally, the leveling tube A21 and the abutting block A23 are integrally formed, which not only improves the strength of the overall structure, but also ensures the stability of the horizontal bubble 20 when installed, and reduces the additional installation time and improves the efficiency of the overall installation.

The present disclosure further provides an air conditioner, which includes an indoor unit of an air conditioner. The indoor unit of the air conditioner is mountable to the air conditioner installation plate 100, and the structure of which may refer to the above embodiments. Since the air conditioner adopts all the technical solutions of all the above embodiments, it has at least all the effects brought by the technical solutions of the above embodiments, which are not described herein again.

The above is only preferred embodiments of the present disclosure, and thus does not limit the scope of the present disclosure, and the equivalent structural transformation made by the content of the specification and the drawings of the present disclosure, or directly/indirectly applied to other related technical fields are all included in the patent protection scope of the present disclosure.

What is claimed is:

1. An air conditioner installation plate comprising: a main plate; two clamping members provided on a surface of the main plate, the clamping members and the main plate collectively defining a clamping space; and a horizontal bubble provided in the clamping space, Wherein the horizontal bubble comprises a leveling tube and two end portions extending from the two ends of the leveling tube respectively in a transverse direction of the horizontal bubble, wherein the leveling tube is filled with a liquid and an air bubble is reserved in the liquid of the leveling tube, and wherein the leveling tube has a consistent cross section in the transverse direction and each end portion has a consistent cross section in the transverse direction, the cross section of the leveling tube being smaller than the cross section of said each end portion; wherein the transverse direction of the horizontal bubble is parallel to a transverse direction of the main plate; wherein two position indicating lines are marked on a middle of the horizontal bubble at an interval along the transverse direction of the horizontal bubble; wherein the two clamping members are separated from each other along the transverse direction of the horizontal bubble; wherein each clamping member comprises a connecting section, a clamping section and a guiding section, wherein the connecting section has a proximal end and an opposite distal end, the proximal end being connected to the surface of the main plate, wherein the clamping section has a proximal end and an opposite distal end, the proximal end of the clamping section being connected to the distal end of the connecting section, and wherein the guiding section has a proximal end and an opposite free end, the proximal end of the guiding section being connected to the distal end of the clamping section, the free end of the guiding section being distanced from the surface of the main plate to define an opening for admitting the horizontal bubble to the clamping space; wherein the main plate defines two through openings extending through the main plate, the two through openings corresponding to the two clamping members respectively and corresponding to the two end portions of the horizontal bubble respectively; wherein each end portion of the horizontal bubble is entirely received in a corresponding through opening when viewed from a direction vertical to the surface of the main plate, wherein each clamping member has a dimension in the transverse direction of the main plate smaller than a dimension of a corresponding through opening in the transverse direction of the main plate; and wherein the main plate comprises a limiting plate provided between the two through openings and connecting the two through openings, wherein the limiting plate is made of an elastic material and is elastically deformable to abut against the leveling tube of the horizontal bubble provided in the clamping space.

2. The air conditioner installation plate according to claim 1, wherein a distance L1 between one side of the bubble and a respective adjacent position indicating line is at least 1 mm and at most 5 mm.

3. The air conditioner installation plate according to claim 1, wherein:
  each clamping member is detachably connected to the main plate; or
  each clamping member and the main plate are integrally formed.

4. The air conditioner installation plate according to claim 1, wherein:
the clamping section has an arc shape, the arc shape being curved along a direction away from the main plate.

5. The air conditioner installation plate according to claim 1, wherein the main plate further comprises two limiting blocks, each abutting a respective end of the horizontal bubble along the transverse direction.

6. The air conditioner installation plate according to claim 1, wherein:
the limiting plate is a curved plate or a flat plate; and/or
the limiting plate and the main plate are integrally formed; and/or
the limiting plate and the main plate are separately formed.

7. The air conditioner installation plate according to claim 1, wherein the horizontal bubble is positioned in an upper half of the main plate and positioned on a central symmetry line of the main plate.

8. The air conditioner installation plate according to claim 1, wherein:
a cross section of the horizontal bubble is cylindrical, a diameter D of the cross section of the horizontal bubble being at least 5 mm and at most 20 mm, or a cross section of the horizontal bubble is rectangular; and/or
the horizontal bubble is a transparent glass tube or a transparent plastic tube.

9. The air conditioner installation plate according to claim 1, wherein a transverse direction of the leveling tube is parallel to the transverse direction of the main plate, the leveling tube being fixed in the clamping space, a side surface of each clamping member facing the end portion being abutted against an end surface of the end portion facing the leveling tube.

10. The air conditioner installation plate according to claim 9, wherein:
a length L3 of the leveling tube is at least 5 mm and at most 100 mm; and/or
a cross section of the leveling tube is cylindrical, a diameter D2 of the cross section of the leveling tube being at least 5 mm and at most 20 mm, or a cross section of the leveling tube is rectangular; and/or
the leveling tube is a transparent glass tube or a transparent plastic tube.

11. The air conditioner installation plate according to claim 9, wherein:
a cross section of the end portion is cylindrical or rectangular; and/or
the leveling tube and the end portion are integrally formed.

12. An air conditioner, comprising:
an indoor unit of an air conditioner; and
an air conditioner installation plate according to claim 1, the indoor unit of the air conditioner is mountable to the air conditioner installation plate.

* * * * *